United States Patent
Lee et al.

(10) Patent No.: US 11,698,748 B2
(45) Date of Patent: Jul. 11, 2023

(54) MEMORY COMPRISING MEMORY CONTROLLER CONFIGURED TO DETERMINE A LOGICAL ADDRESS OF A TARGET ZONE SYSTEM AND METHOD OF OPERATING THE MEMORY CONTROLLER

(71) Applicant: SK hynix Inc., Gyeonggi-do (KR)

(72) Inventors: Yu Jung Lee, Gyeonggi-do (KR); Bo Kyeong Kim, Gyeonggi-do (KR); Do Hyeong Lee, Gyeonggi-do (KR); Min Kyu Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 29 days.

(21) Appl. No.: 17/307,325

(22) Filed: May 4, 2021

(65) Prior Publication Data

US 2022/0137858 A1    May 5, 2022

(30) Foreign Application Priority Data

Oct. 30, 2020    (KR) .................. 10-2020-0143764

(51) Int. Cl.
*G06F 3/06* (2006.01)

(52) U.S. Cl.
CPC .......... *G06F 3/0655* (2013.01); *G06F 3/0604* (2013.01); *G06F 3/0631* (2013.01); *G06F 3/0679* (2013.01)

(58) Field of Classification Search
CPC ....... G06F 3/0659; G06F 3/0688; G06F 3/061
See application file for complete search history.

(56) References Cited

U.S. PATENT DOCUMENTS

| | | | |
|---|---|---|---|
| 2016/0139984 A1* | 5/2016 | Lee ............... | H03M 13/05 714/758 |
| 2019/0050289 A1* | 2/2019 | Kachare .......... | G06F 11/1076 |
| 2019/0057025 A1* | 2/2019 | Lee ............... | G06F 12/0246 |
| 2020/0341647 A1* | 10/2020 | McSweeney ..... | G06F 16/1744 |
| 2021/0081330 A1* | 3/2021 | Bennett .......... | G06F 3/0679 |
| 2021/0173785 A1* | 6/2021 | Jin ............... | G06F 12/0246 |
| 2021/0223994 A1* | 7/2021 | Kanno ............ | G06F 3/0679 |
| 2022/0004496 A1* | 1/2022 | Ha ............... | G06F 12/1009 |

FOREIGN PATENT DOCUMENTS

| | | |
|---|---|---|
| KR | 10-0321987 B1 | 2/2002 |
| KR | 10-2019-0083148 A | 7/2019 |

\* cited by examiner

*Primary Examiner* — Sean D Rossiter
(74) *Attorney, Agent, or Firm* — IP & T Group LLP

(57) ABSTRACT

A memory system according to the present technology may include a plurality of memory devices including a plurality of blocks configured of memory cells and a memory controller configured to control the plurality of memory devices corresponding to a plurality of zones by configuring the plurality of zones with the plurality of blocks included in each of the plurality of memory devices, wherein the memory controller is further configured to: receive a write request from a host, determine a target zone indicated by the write request among the plurality of zones, and determine a logical address of the target zone on which a write operation is to be started based on a write pointer and an offset corresponding to the target zone.

19 Claims, 14 Drawing Sheets

MEMORY COMPRISING MEMORY CONTROLLER CONFIGURED TO DETERMINE A LOGICAL ADDRESS OF A TARGET ZONE SYSTEM AND METHOD OF OPERATING THE MEMORY CONTROLLER

CROSS-REFERENCE TO RELATED APPLICATION

The present application claims priority under 35 U.S.C. § 119(a) to Korean patent application number 10-2020-0143764, filed on Oct. 30, 2020, which is incorporated herein by reference in its entirety.

BACKGROUND

Field of Invention

The present disclosure relates to a memory system, and more particularly, to a memory system and a method of operating a memory controller included therein.

Description of Related Art

A storage device stores data under control of a host device such as a computer or a smartphone. The storage device may include a memory device in which data is stored and a memory controller controlling the memory device. The memory device is divided into a volatile memory device and a nonvolatile memory device.

The volatile memory device stores data only when power is supplied and loses the stored data when the power supply is cut off. The volatile memory device includes a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a memory system capable of efficiently and quickly performing a write operation on a plurality of zones simultaneously, and a method of operating the same.

A memory system according to an embodiment of the present disclosure may include a plurality of memory devices including a plurality of blocks configured of memory cells and a memory controller configured to control the plurality of memory devices corresponding to a plurality of zones by configuring the plurality of zones with the plurality of blocks included in each of the plurality of memory devices, wherein the memory controller is further configured to: receive a write request from a host, determine a target zone indicated by the write request among the plurality of zones, and determine a logical address of the target zone on which a write operation is to be started based on a write pointer and an offset corresponding to the target zone.

A method of operating a memory controller according to an embodiment of the present disclosure may include receiving a write request from a host, determining a logical address of a target zone indicated by the write request among a plurality of zones configured of blocks included in each of a plurality of memory devices, the logical address of the target zone on which a write operation is to be started based on a write pointer and an offset corresponding to the target zone, determining a physical address of a memory device corresponding to the logical address of the target zone among the plurality of memory devices and transmitting a write command corresponding to the write request and the physical address to the memory device corresponding to the logical address of the target zone.

A memory system according to an embodiment of the present disclosure may include plural memory devices each including first block groups and second block groups each having at least a memory block, the first block groups of the respective devices configuring a first zone and the second block groups of the respective devices configuring a second zone and a controller configured to control the devices, through respectively corresponding channels, to simultaneously access the first zone according to a first pointer and a first offset, and the second zone according to a second pointer and a second offset, which is different from the first offset, wherein each of the first and second offsets has a length in units corresponding to the respective devices.

The present technology provides a memory system capable of efficiently and quickly performing a write operation on a plurality of zones simultaneously, and a method of operating the same.

DETAILED DESCRIPTION

Specific structural or functional descriptions of embodiments which are disclosed in the present specification or application are illustrated only to describe the embodiments according to the present disclosure. The embodiments according to the present disclosure may be carried out in various forms and are not limited to the embodiments described in the present specification or application.

Figure 1:
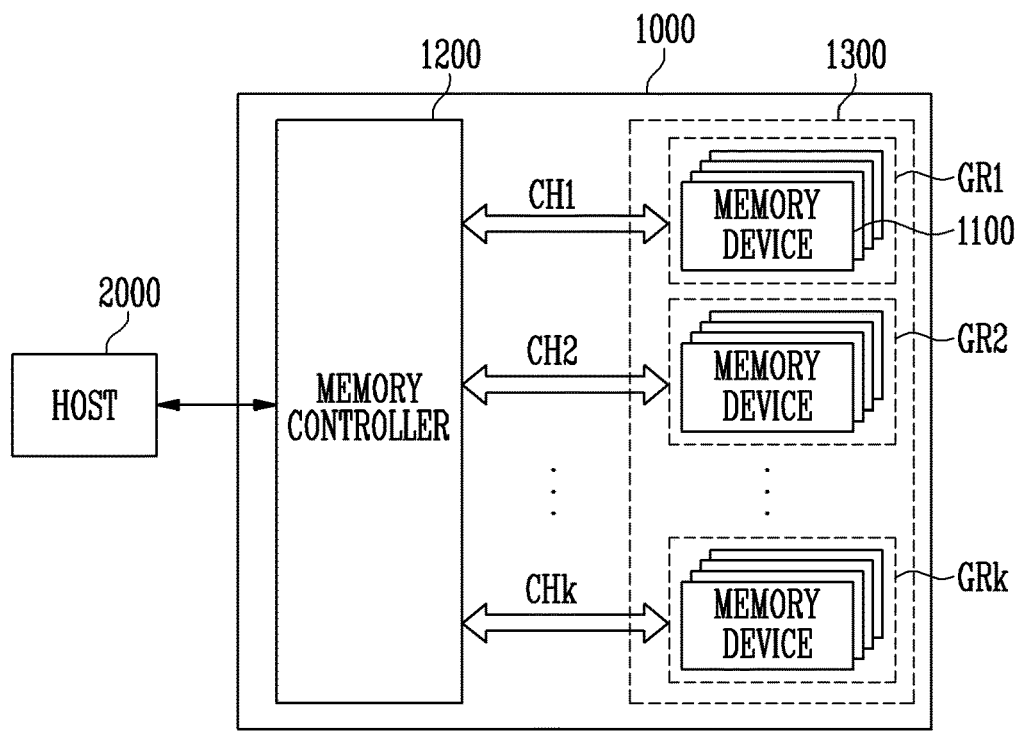
FIG. 1 is a diagram illustrating a memory system according to an embodiment of the present disclosure.

FIG. 1 is a diagram illustrating a memory system according to an embodiment of the present disclosure.

Referring to FIG. 1, the memory system 1000 may include a memory device 1100 in which data is stored, and/or a memory controller 1200 that controls the memory device 1100 according to a request of a host 2000.

The host 2000 may communicate with the memory system 1000 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The memory device 1100 may be implemented as a volatile memory device in which data is lost when power supply is cut off or a nonvolatile memory device in which data is maintained even though power supply is cut off. The memory device 1100 may perform a program operation, a read operation, or an erase operation under control of the memory controller 1200. For example, during the program operation, the memory device 1100 may receive a command, an address, and data from the memory controller 1200 and perform the program operation. During the read operation, the memory device 1100 may receive a command and an address from the memory controller 1200, and output data stored in a position (for example, a physical address) corresponding to the received address to the memory controller 1200. The memory device 1100 may be referred to as a chip or a die of an individual integrated chip (IC).

The memory system 1000 may include a plurality of memory devices 1100, and the plurality of memory devices may be grouped into a plurality of memory device groups 1300 according to a channel connected to the memory controller 1200. For example, among the memory devices, memory devices connected to the memory controller 1200 through a first channel CH1 may be referred to as a first group GR1. Among the memory devices, memory devices connected to the memory controller 1200 through a second channel CH2 may be referred to as a second group GR2.

FIG. 1 illustrates that one group includes a plurality of memory devices. However, one group may include a single memory device 1100.

The memory controller 1200 may control an overall operation of the memory system 1000 and control data exchange between the host 2000 and the memory device 1100. For example, when a command is received from the host 2000, the memory controller 1200 may control the memory device groups 1300 connected to respective channels CH1 to CHk according to the received command. The memory controller 1200 may generate commands instructing a program, read, or erase according to a request of the host 2000, and transmit the generated commands to the memory device groups 1300 connected to each channel.

Figure 2:
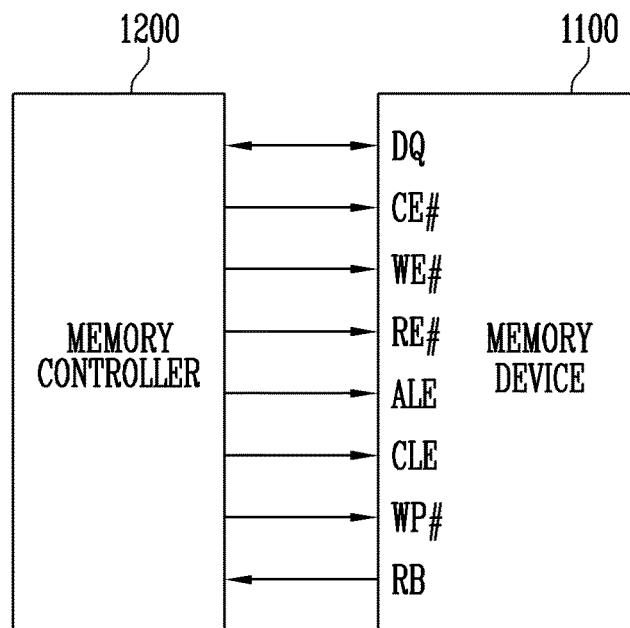
FIG. 2 is a diagram illustrating signals exchanged between a memory controller and a memory device according to FIG. 1.

FIG. 2 is a diagram illustrating signals exchanged between the memory controller and the memory device according to FIG. 1.

Referring to FIG. 2, the memory controller 1200 and the memory device 1100 may exchange a command, data, and/or an address with each other through an input/output pad DQ. For example, the input/output pad DQ may be configured of eight lines to transmit and receive data of 8 bits, and each line may transmit and receive data of 1 bit.

The memory device 1100 may receive a chip enable signal through a CE # pad, receive a write enable signal through a WE # pad, receive a read enable signal through an RE # pad, receive an address latch enable signal through an ALE pad, receive a command latch enable signal through a CLE pad, and receive a write protection signal through a WP # pad.

The address latch enable signal may be a signal provided by the memory controller 1200 to the memory device 1100 so that the memory device 1100 loads the address provided to the memory device 1100 through the input/output pad DQ in an address register. The chip enable signal may be a signal provided by the memory controller 1200 to the memory device 1100 to enable or disable one or more memory devices. The command latch enable signal may be a signal provided by the memory controller 1200 to the memory device 1100 so that the memory device 1100 loads the command provided to the memory device 1100 through the input/output pad DQ in a command register. The read enable signal may be a signal provided by the memory controller 1200 to the memory device 1100 so that the memory device 1100 transmits the data to the memory controller 1200. The write enable signal may be a signal informing that the command, the address, and the data are transferred.

The memory device 1100 may output a ready-busy signal to the memory controller 1200 through an RB pad RB. The ready-busy signal may indicate whether a memory array of the memory device 1100 is in a busy state or an idle state.

FIG. 2 illustrates a connection relationship between one memory device 1100 and the memory controller 1200. However, the input/output pad DQ, the CE # pad, the WE # pad, the RE # pad, the ALE pad, the CLE pad, and the WP # pad may form the channels CH1 to CHk, and the memory controller 1200 and one of the memory device groups 1300 may be connected through the formed channels CH1 to CHk.

Therefore, when the memory controller 1200 transmits the command, the data, and/or the address through the input/output pad DQ included in one channel, all of the memory devices 1100 belonging to a group connected to the corresponding channel or a memory device 1100 selected by the memory controller 1200 in a group connected to the corresponding channel may receive the command, the data, and/or the address. For example, the memory controller 1200 may transmit the status read command to the memory devices 1100 through the input/output pad DQ corresponding to the first channel CH1, and, at least one of the memory devices in the first group GR1 connected to the first channel CH1 may transmit status information to the input/output pad DQ in response to the status read command.

Figure 3:
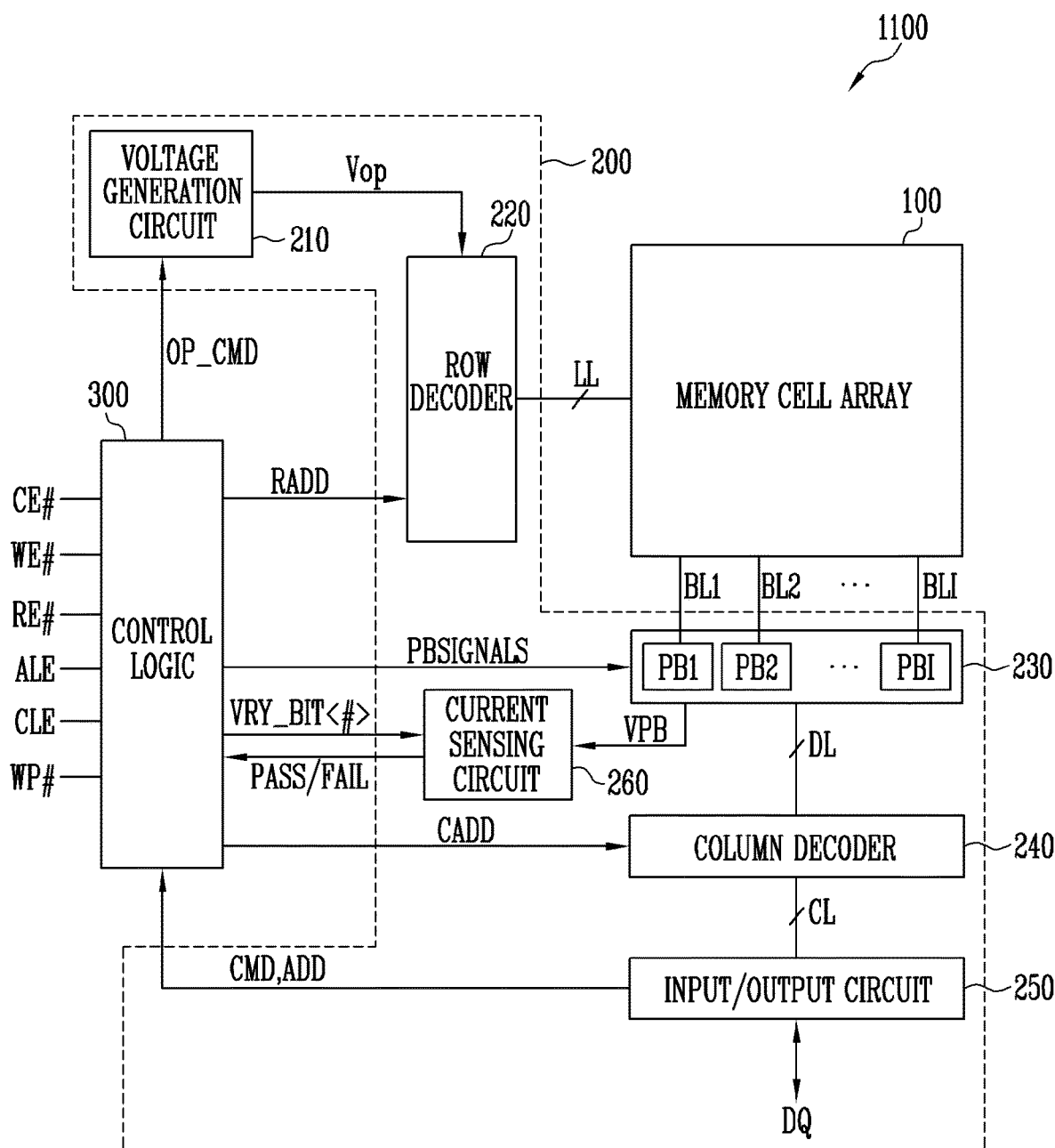
FIG. 3 is a diagram specifically illustrating the memory device of FIG. 1.

FIG. 3 is a diagram for specifically illustrating the memory device of FIG. 1.

The memory device 1100 may be implemented as a volatile memory device or a nonvolatile memory device. For example, the memory device 1100 may be one of volatile memory devices such as a dynamic random access memory (DRAM) and a static RAM (SRAM), and a nonvolatile memory device such as a read only memory (ROM), a mask ROM (MROM), a programmable ROM (PROM), an erasable programmable ROM (EPROM), an electrically erasable programmable ROM (EEPROM), a ferromagnetic RAM (FRAM), a phase change RAM (PRAM), a magnetic RAM (MRAM), a resistive RAM (RRAM), and a flash memory. FIG. 3 illustrates a nonvolatile memory device as an example.

The memory device 1100 may include a memory cell array 100 in which data is stored. The memory device 1100 may include peripheral circuits 200 configured to perform a program operation for storing data in the memory cell array 100, a read operation for outputting the stored data, and an erase operation for erasing the stored data. The memory device 1100 may include a control logic 300 that controls the peripheral circuits 200 under control of the memory controller 1200.

The memory cell array 100 includes a plurality of memory cells in which data is stored. For example, the memory cell array 100 may include at least one plane, the plane may include one or more memory blocks. In an embodiment, the plane may be a unit of a memory area accessed when the program, read, or erase operation is performed. Each of the memory blocks may include a plurality of memory cells. A structure including a plurality of planes may be referred to as a multi-plane structure. User data and information necessary for an operation of the memory device 1100 may be stored in the memory blocks. The memory blocks may be implemented in a two-dimensional or three-dimensional structure. The memory blocks having the two-dimensional structure may include memory cells arranged parallel to a substrate, and the memory blocks having the three-dimensional structure may include memory cells stacked vertically on the substrate.

The peripheral circuits 200 may be configured to perform the program, read, and erase operations according to the control of the control logic 300. For example, the peripheral circuits 200 may include a voltage generation circuit 210, a row decoder 220, a page buffer group 230, a column decoder 240, an input/output circuit 250, and a current sensing circuit 260.

The voltage generation circuit 210 may generate various operation voltages Vop used for the program, read, and erase operations, in response to an operation signal OP_CMD output from the control logic 300. For example, the voltage generation circuit 210 may generate various voltages, such as a program voltage, a verify voltage, a pass voltage, a read voltage, and an erase voltage, under the control of the control logic 300.

The row decoder 220 may supply the operation voltages Vop to local lines LL connected to a selected memory block among the memory blocks of the memory cell array 100, in response to a row address RADD output from the control logic 300. The local lines LL may include local word lines, local drain select lines, and/or local source select lines. In addition, the local lines LL may include various lines connected to the memory block, such as a source line.

The page buffer group 230 may be connected to bit lines BL1 to BLI connected to the memory blocks of the memory cell array 100. The page buffer group 230 may include a plurality of page buffers PB1 to PBI connected to the bit lines BL1 to BLI. The page buffers PB1 to PBI may operate in response to page buffer control signals PBSIGALS output from the control logic 300. For example, the page buffers PB1 to PBI may temporarily store data received through the bit lines BL1 to BLI, or may sense a voltage or a current of the bit lines BL1 to BLI during the read operation or a verify operation.

The column decoder 240 may transfer data between the input/output circuit 250 and the page buffer group 230 in response to a column address CADD output from the control logic 300. For example, the column decoder 240 may exchange data with the page buffers PB1 to PBI through data lines DL, or exchange data with the input/output circuit 250 through column lines CL.

The input/output circuit 250 may receive a command CMD, an address ADD, and data from the memory controller 1200 through the input/output pad DQ, and output data read from the memory cell array 100 to the memory controller 1200 through the input/output pad DQ. For example, the input/output circuit 250 may transfer the command CMD and the address ADD received from the memory controller 1200 to the control logic 300 or exchange data DATA with the column decoder 240.

During the read operation or the verify operation, the current sensing circuit 260 may generate a reference current in response to a permission bit VRY_BIT<#>, compare a sensing voltage VPB received from the page buffer group 230 with a reference voltage generated by the reference current, and output a pass signal PASS or a fail signal FAIL.

The control logic 300 may receive the command CMD and the address ADD in response to the signals received through the CE #, WE #, RE #, ALE, CLE, and WP # pads. The control logic 300 may generate control signals for controlling the peripheral circuits 200 in response to receiving the command CMD and the address ADD, and output the generated control signals to the peripheral circuits 200. For example, the control signals may include at least one of the operation signal OP_CMD, the row address RADD, the page buffer control signals PBSIGNALS, and the permission bit VRY_BIT<#>. The control logic 300 may output the operation signal OP_CMD to the voltage generation circuit 210, output the row address RADD to the row decoder 220, output the page buffer control signals PBSIGNALS to the page buffer group 230, and output the permission VRY_BIT<#> to the current sensing circuit 260. In addition, the control logic 300 may determine whether the verify operation has passed or failed in response to the pass signal PASS or the fail signal FAIL.

Figure 4:
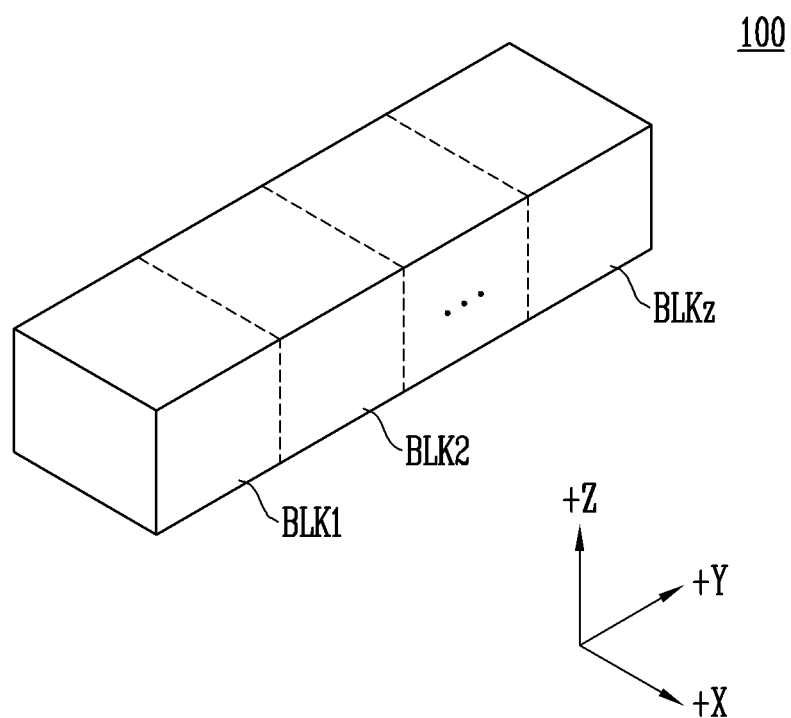
FIG. 4 is a diagram illustrating an embodiment of a memory cell array of FIG. 3.

FIG. 4 is a diagram illustrating an embodiment of the memory cell array of FIG. 3 according to an embodiment of the present disclosure.

Referring to FIG. 4, the memory cell array 100 includes a plurality of memory blocks BLK1 to BLKz. Each memory block may have a three-dimensional structure. Each memory block may include a plurality of memory cells stacked on a substrate. The plurality of memory cells may be arranged along a +X direction, a +Y direction, and a +Z direction.

Figure 5:
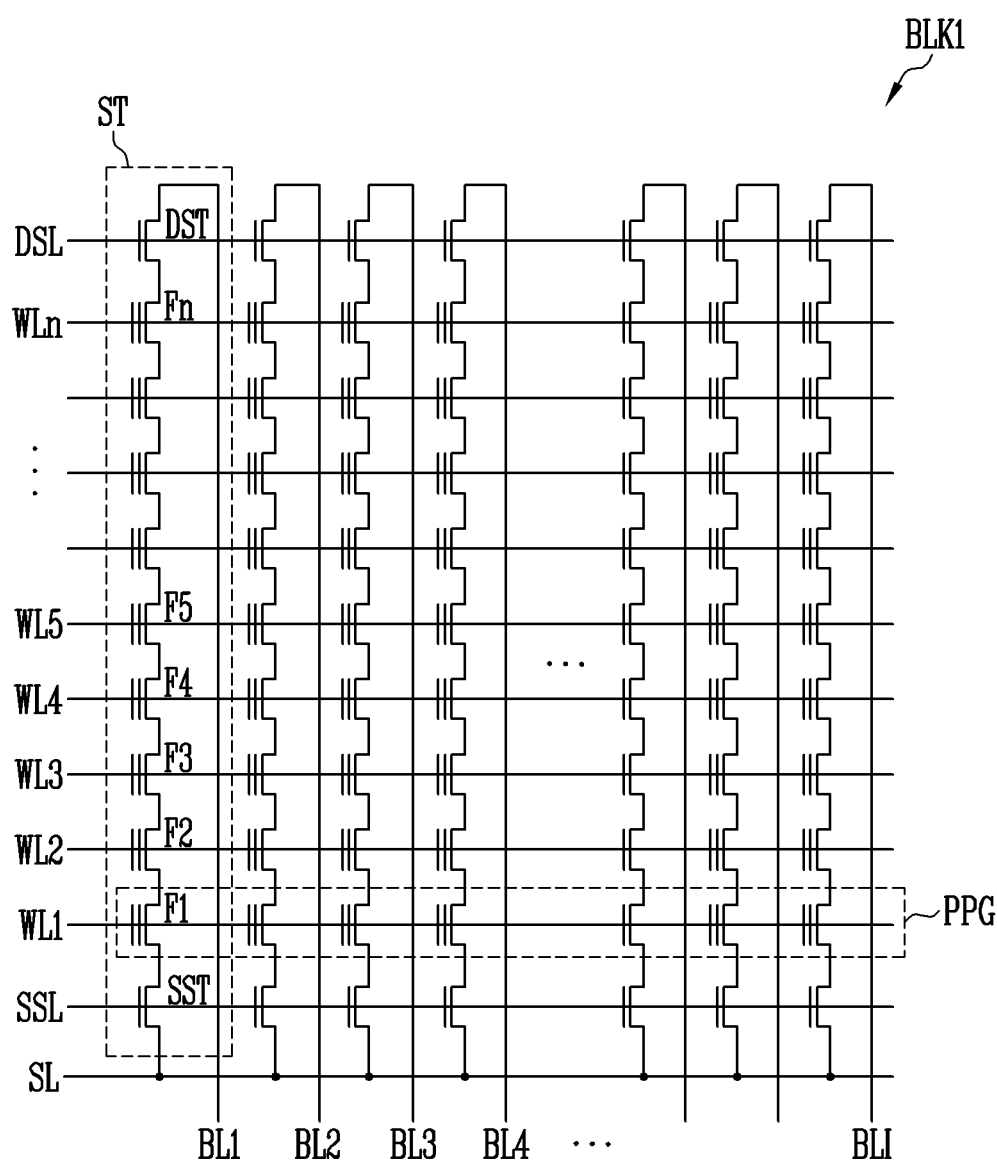
FIG. 5 is a diagram illustrating a memory block of FIG. 4.

FIG. 5 is a diagram illustrating the memory block of FIG. 4.

Referring to FIG. 5, the first memory block BLK1 among the plurality of memory blocks BLK1 to BLKz shown in FIG. 4 is shown. The remaining memory blocks BLK2 to BLKz may have the same shape as the first memory block BLK1.

The first memory block BLK1 may include a plurality of cell strings ST connected between bit lines BL1 to BLI and a source line SL. For example, the cell strings ST may be connected to the bit lines BL1 to BLI, respectively, and may be commonly connected to the source line SL. Since the cell strings ST are configured similarly to each other, a string ST connected to the first bit line BL1 is described as an example as follows.

The cell string ST may include a source select transistor SST, first to n-th memory cells F1 to Fn (n is a positive integer), and a drain select transistor DST connected in series between the source line SL and the first bit line BL1. The number of source and drain select transistors SST and DST is not limited to the number shown in FIG. 5. The source select transistor SST may be connected between the source line SL and the first memory cell F1. The first to n-th memory cells F1 to Fn may be connected in series between the source select transistor SST and the drain select transistor DST. The drain select transistor DST may be connected between the n-th memory cell Fn and the first bit line BL1. Although not shown in the drawing, dummy cells may be further connected between the memory cells F1 to Fn or between the source select transistor SST and the drain select transistor DST.

Gates of the source select transistors SST included in the different cell strings ST may be connected to a source select line SSL, gates of the first to n-th memory cells F1 to Fn may be connected to first to n-th word lines WL1 to WLn, and gates of the drain select transistors DST may be connected to drain select lines DSL. Here, a group of memory cells connected to the word lines WL1 to WLn, respectively, is referred to as a page PG. For example, a group of the first memory cells F1 connected to the first word line WL1 among the memory cells F1 to Fn included in the different cell strings ST may be one physical page PPG. The program and read operations may be performed in a unit of the physical page PPG.

Figure 6:
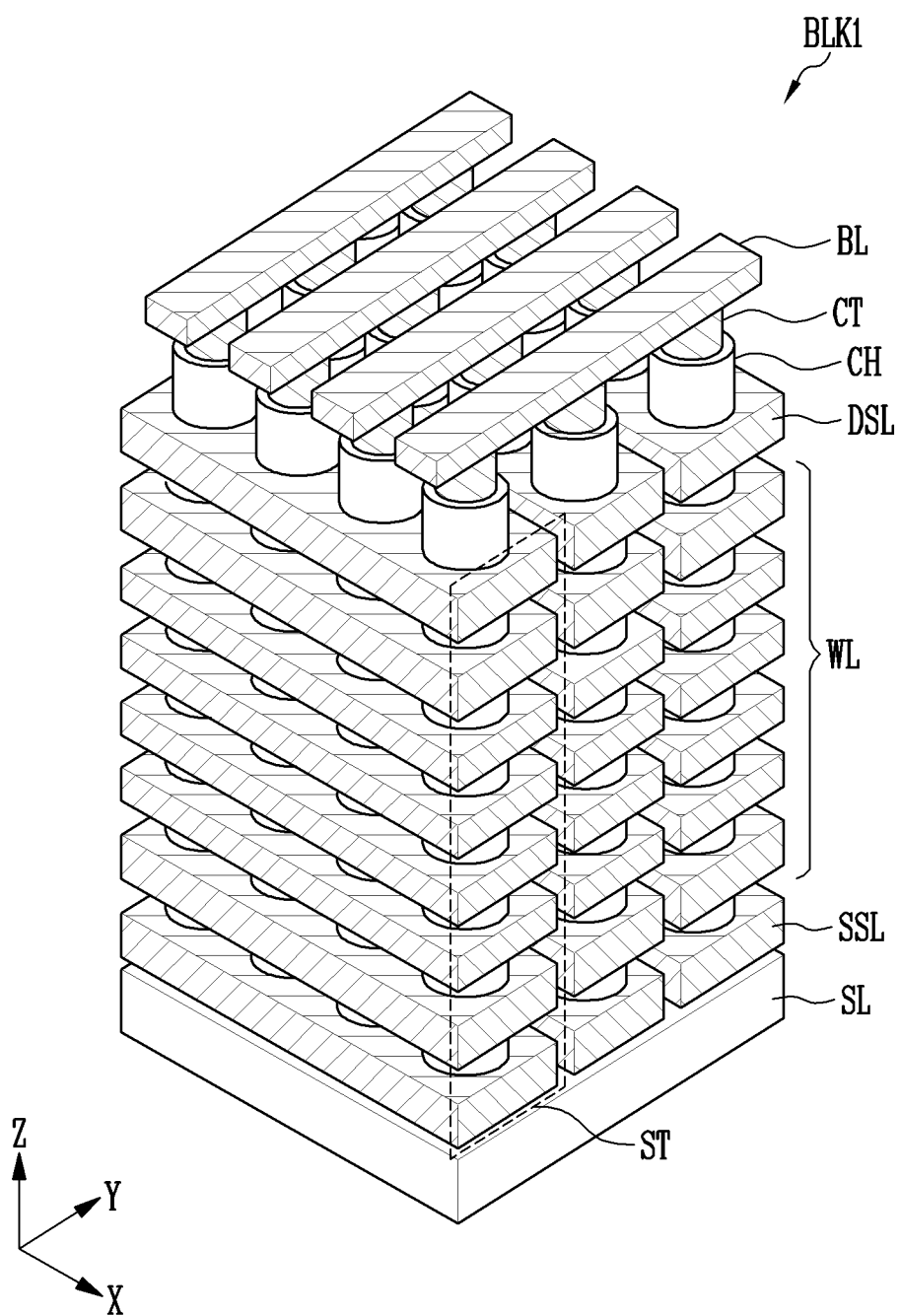
FIG. 6 is a diagram illustrating an embodiment of the present disclosure in which the memory block of FIG. 4 is configured in a three dimension.

FIG. 6 is a diagram illustrating an embodiment in which the memory block of FIG. 4 is configured in a three dimension.

Referring to FIG. 6, the first memory block BLK1 among the plurality of memory blocks BLK1 to BLKz shown in FIG. 4 is shown. The remaining memory blocks BLK2 to BLKz may have the same shape as the first memory block BLK1.

The memory block BLK1 implemented in a three-dimensional structure may be formed in a vertical (Z direction) I shape on a substrate, and may include the plurality of cell strings ST arranged between the bit lines BL and the source line SL. Alternatively, a well may be formed instead of the source line SL. Such a structure is also referred to as bit cost scalable (BiCS) structure. For example, when the source line SL is horizontally formed on the substrate, the cell strings ST having the BiCS structure may be formed in the vertical direction (Z direction) on the source line SL.

More specifically, the cell strings ST may be arranged in each of a first direction (X direction) and a second direction (Y direction). The cell strings ST may include the source select lines SSL, the word lines WL, and the drain select lines DSL that are stacked and spaced apart from each other. The number of the source select lines SSL, word lines WL, and drain select lines DSL is not limited to the number shown in the drawing, and may be different according to the memory device 1100. The cell strings ST may include a vertical channel film CH vertically passing through the source select lines SSL, the word lines WL, and the drain select lines DSL, and the bit lines BL which are in contact with an upper portion of the vertical channel film CH protruded to an upper portion of the drain select lines DSL and extend in the second direction (Y direction). The memory cells may be formed between the word lines WL and the vertical channel films CH. A contact plug CT may be further formed between the bit lines BL and the vertical channel films CH.

Figure 7:
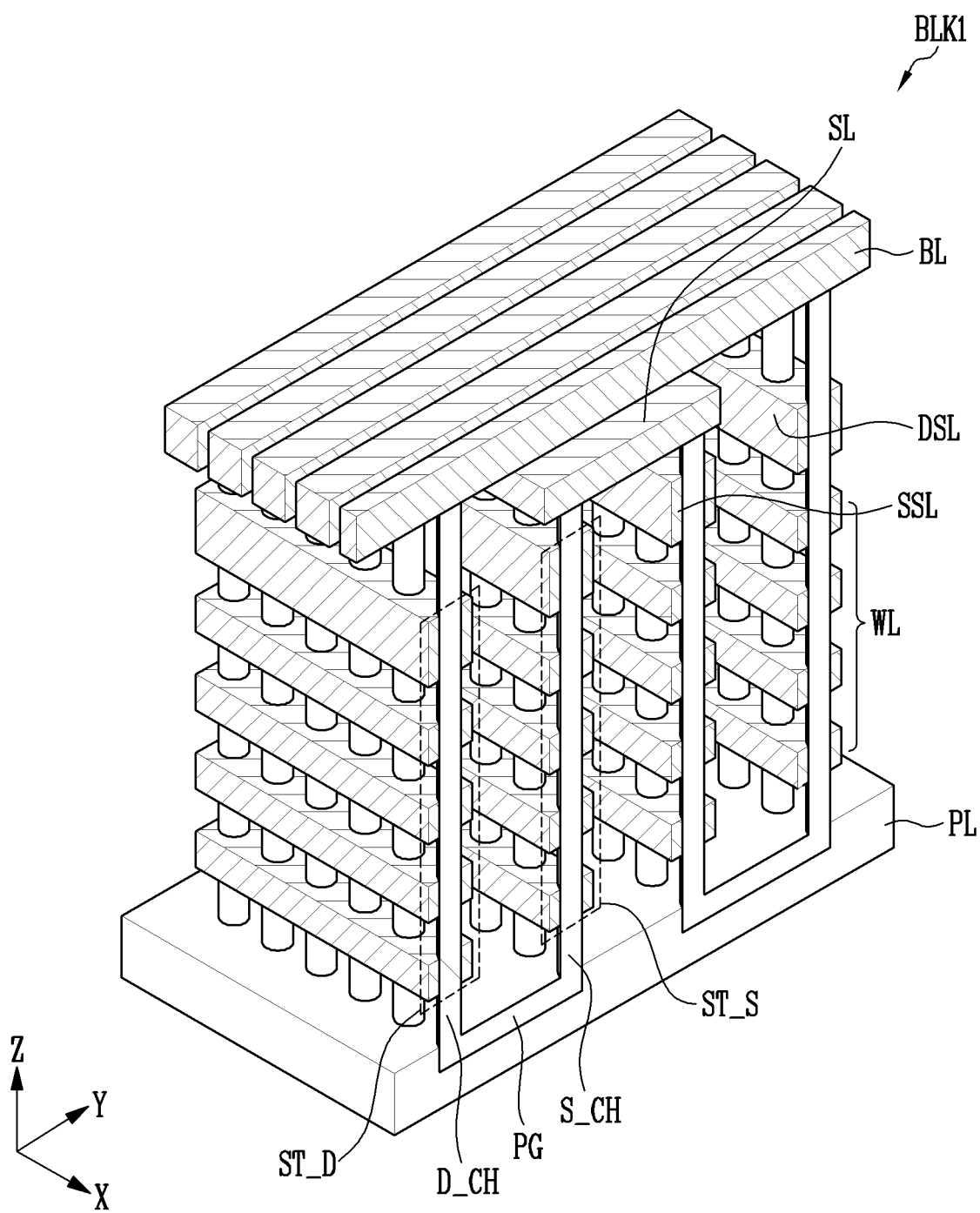
FIG. 7 is a diagram illustrating another embodiment of the present disclosure in which the memory block of FIG. 4 is configured in a three dimension.

FIG. 7 is a diagram illustrating another embodiment of the present disclosure in which the memory block of FIG. 4 is configured in three dimensions.

Referring to FIG. 7, the first memory block BLK1 among the plurality of memory blocks BLK1 to BLKz shown in FIG. 4 is shown. The remaining memory blocks BLK2 to BLKz may have the same shape as the first memory block BLK1.

The first memory block BLK1 implemented in a three-dimensional structure may be formed in a U shape of a vertical direction (Z direction) on a substrate, and may include a pair of source strings ST_S and drain strings ST_D connected between the bit lines BL and the source lines SL. The source strings ST_S and the drain strings ST_D may be connected to each other through a pipe gate PG to form a U-shaped structure. The pipe gate PG may be formed in a pipeline PL. More specifically, the source strings ST_S may be vertically formed between the source lines SL and the pipeline PL, and the drain strings ST_D may be vertically formed between the bit lines BL and the pipeline PL. Such a structure is also referred to as pipe-shaped bit cost scalable (P-BiCS) structure.

More specifically, the drain strings ST_D and the source strings ST_S may be arranged in the first direction (X direction) and the second direction (Y direction), respectively, and the drain strings ST_D and the source strings ST_S may be alternately arranged along the second direction (Y direction). The drain strings ST_D may include the word lines WL and the drain select line DSL that are stacked and spaced apart from each other, and drain vertical channel films D_CH vertically passing through the word lines WL and the drain select lines DSL. The source strings ST_S may include the word lines WL and the source select line SSL that are stacked and spaced apart from each other, and source vertical channel films S_CH vertically passing through the word lines WL and the source select lines SSL. The drain vertical channel films D_CH and the source vertical channel films S_CH may be connected to each other by the pipe gate PG in the pipeline PL. The bit lines BL may be in contact with an upper portion of the drain vertical channel films D_CH protruded to an upper portion of the drain select line DSL and may extend in the second direction (Y direction).

Figure 8:
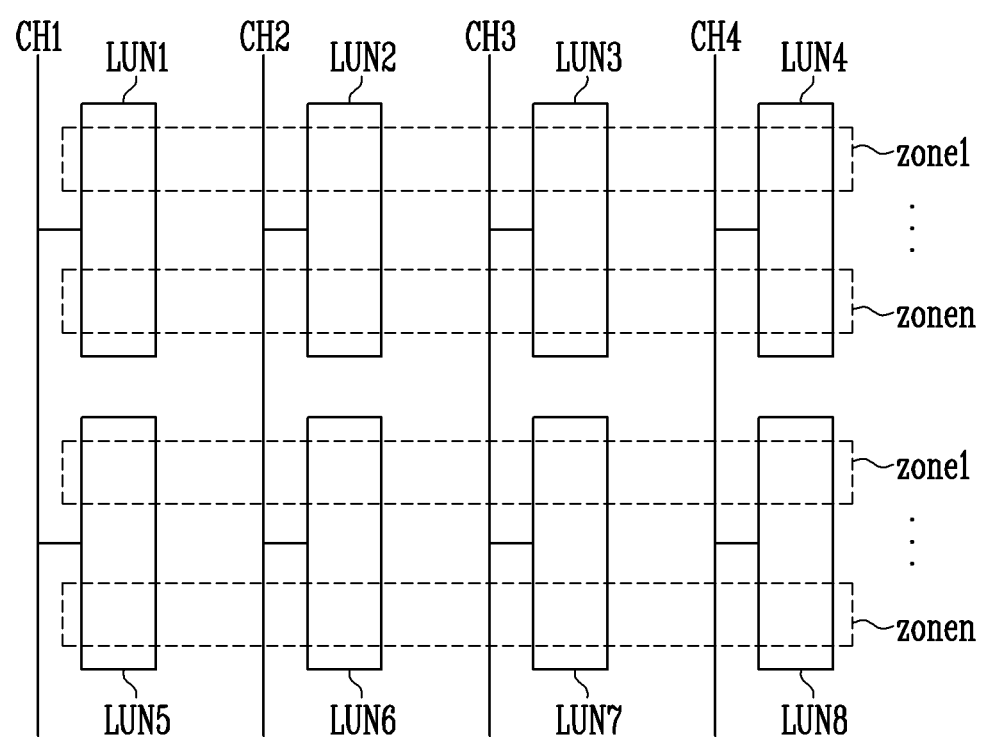
FIG. 8 is a diagram illustrating a method of configuring a zone including blocks included in memory devices according to an embodiment of the present disclosure.

FIG. 8 is a diagram illustrating a method of configuring a zone including blocks included in memory devices according to an embodiment of the present disclosure.

Referring to FIG. 8, the memory controller 1200 may configure zones zone1 to zonen with the blocks included in each of at least some of the memory devices LUN1 to LUN8 connected through channels CH1 to CH4, and store data in the memory devices or read data stored in the memory devices in a zone unit.

For example, as shown in FIG. 8, the first memory device LUN1 and the fifth memory device LUN5 may be connected to the memory controller 1200 through the first channel CH1, the second memory device LUN2 and the sixth memory device LUN6 may be connected to the memory controller 1200 through the second channel CH2, the third memory device LUN3 and the seventh memory device LUN7 may be connected to the memory controller 1200 through the third channel CH3, and the fourth memory device LUN4 and the eighth memory device LUN8 may be connected to the memory controller 1200 through the fourth channel CH4.

In such an example, memory devices connected to the memory controller 1200 through an independent channel may be configured as the zone. For example, the first zone zone1 may be configured by combining a first block group (a block group may be referred to as a group of two or more blocks) of the first memory device LUN1 connected to the first channel CH1, a first block group of the second memory device LUN2 connected to the second channel CH2, a first block group of the third memory device LUN3 connected to the third channel CH3, and a first block group of the fourth memory device LUN4 connected to the fourth channel CH4. In addition, the n-th zone zonen may be configured by combining an n-th block group (n is a natural number equal to or greater than 2) of the first memory device LUN1 connected to the first channel CH1, an n-th block group of the second memory device LUN2 connected to the second channel CH2, an n-th block group of the third memory device LUN3 connected to the third channel CH3, and an n-th block group of the fourth memory device LUN4 connected to the fourth channel CH4.

In an embodiment, each of the blocks of the memory devices LUN1 to LUN8 configuring one zone may have the same physical address. For example, the first block group of the first memory device LUN1, the first block group of the second memory device LUN2, the first block group of the third memory device LUN3, and the first block group of the fourth memory device LUN4 may have the same physical address in the memory device.

In the same method, other first to n-th zones zone1 to zonen may be configured by combining blocks (or a block group) of the fifth memory device LUN5 connected to the first channel CH1, blocks of the sixth memory device LUN6 connected to the second channel CH2, blocks of the seventh memory device LUN7 connected to the third channel CH3, and blocks of the eighth memory device LUN8 connected to the fourth channel CH4.

As described above, when the zones zone1 to zonen are configured using the plurality of memory devices connected to the memory controller 1200 respectively through the independent channels, a write operation or a read operation on the zones zone1 to zonen may be performed by minimizing a channel bottleneck phenomenon.

Meanwhile, the zones zone1 to zonen may not be configured of memory devices that are connected to the memory controller 1200 through independent channels. For example, some of the memory devices configuring the n zones zone1 to zonen may be connected to the memory controller 1200 through the same channel.

In addition, in FIG. 8, the blocks included in four memory devices are used to configure one zone, but the number of memory devices may be variously determined. For example, one zone may be configured by combining the blocks of all memory devices connected to the memory controller 1200. Here, the number of memory devices configuring one zone may be determined according to a size of the zone, the number of blocks included in each memory device, and the like.

Figure 9:
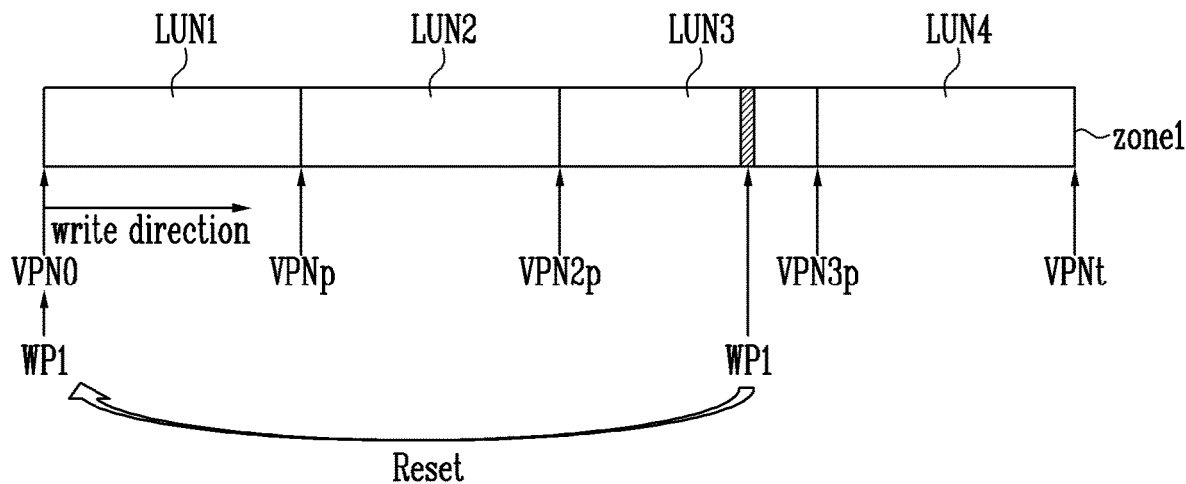
FIG. 9 is a diagram illustrating the zone according to FIG. 8.

FIG. 9 is a diagram illustrating the zone according to FIG. 8.

Referring to FIG. 9, an example of the zone is described based on the first zone zone1 among the zones zone1 to zonen shown in FIG. 8. In an embodiment, each of the zones zone 1 to zonen may be configured identically.

Referring to FIG. 9, the first zone zone1 may be configured of the blocks of the first memory device LUN1, the blocks of the second memory device LUN2, the blocks of the third memory device LUN3, and the blocks of the fourth memory device LUN4. In an embodiment, the first zone zone1 may have logical addresses VPN0 to VPNt corresponding to (or matching) the physical addresses of the first to fourth memory devices LUN1 to LUN4.

For example, a first logical address VPN0 (hereinafter may be referred to as a start logical address) to a p-th (p is a natural number equal to or greater than 2) logical addresses (not shown) may correspond to the physical addresses (for example, a page address) of the first memory device LUN1. In addition, a (p+1)-th logical address VPNp to a 2p-th logical address (not shown) may correspond to the physical addresses of the second memory device LUN2. In addition, a (2p+1)-th logical address VPN2$p$ to a 3p-th logical address (not shown) may correspond to the physical addresses of the third memory device LUN3. In addition, a (3p+1)-th logical address VPN3$p$ to t-th (t is a natural number greater than 3p+1 and may be the same as 4p-1) logical address VPNt may correspond to the physical addresses of the fourth memory device LUN4. Here, the t-th logical address VPNt may be the last logical address configuring the first zone zone1.

Storage spaces of each of the memory devices configuring one zone may have the same size. In other words, the number of logical addresses corresponding to the first memory device LUN1, the number of logical addresses corresponding to the second memory device LUN2, the number of logical addresses corresponding to the third memory device LUN3, and the number of logical addresses corresponding to the fourth memory device LUN4 may be the same.

A write pointer indicating a logical address on which a write operation is to be started may be allocated to each of the zones zone1 to zonen. The write pointer may be determined by the memory controller 1200 and may be allocated to each of the zones. For example, the memory controller 1200 may determine an initial value of the write pointer to indicate the start logical address VPN0 of each zone. For example, the initial value of the write pointer WP1 corresponding to the first zone zone1 may indicate the start logical address VPN0 of the first zone zone1.

Each of the zones zone1 to zonen may be configured so that the write operation is performed from the logical address indicated by the write pointer. In an embodiment, when the write operation is ended, the memory controller 1200 may update the write pointer to indicate a logical address on which a next write operation is to be started. For example, the write operation on the first zone zone1 may be sequentially performed from the start logical address VPN0 of the first zone zone1. When the write operation is ended, the write pointer WP1 of the first zone zone1 may be updated, within a range of the logical addresses representing the first zone zone1, to indicate a logical address corresponding to a specific physical address of the third memory device LUN3 on which the write operation is ended. Therefore, the next write operation on the first zone zone1 may start from the third memory device LUN3 corresponding to the logical address indicated by the updated write pointer WP1 of the first zone zone1.

Each of the zones zone1 to zonen may be reset so that data may be rewritten from the beginning. For example, when receiving a reset request for the first zone zone1 among the zones zone1 to zonen from the host 2000, the memory controller 1200 may reset the first zone zone1 by updating (resetting) the write pointer so that the write pointer WP1 of the first zone zone1 indicates the start logical address VPN0. In addition, when the zone is reset or when the reset zone is switched to an open state, physical addresses (or memory blocks corresponding to the physical addresses) of the memory devices corresponding to the logical addresses of the reset zone may be erased.

Figure 10:
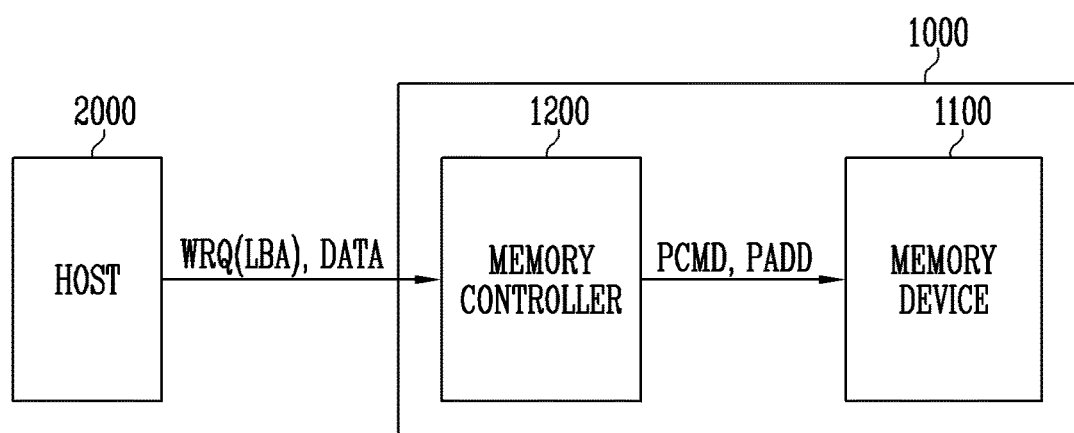
FIG. 10 is a diagram illustrating an operation between a host and a memory system based on the zone according to FIG. 8.

FIG. 10 is a diagram illustrating an operation between a host and a memory system based on the zone according to FIG. 8.

Referring to FIG. 10, the host 2000 may transmit a write request WRQ indicating one of the zones zone1 to zonen and data DATA to be stored to the memory controller 1200. The write request WRQ may include a host logical address (logical block address LBA) mapped to the data DATA by the host 2000. The host logical address LBA may be mapped with the logical addresses of each of the zones zone1 to zonen (for example, VPN0 to VPNt of FIG. 11) in advance. For example, a first to m-th host logical addresses LBA 0 to LBA m−1 (m is a natural number equal to or greater than 2) may be mapped with the logical addresses VPN0 to VPNt of the first zone zone1 to the n-th zone zonen. The host logical address LBA may be mapped with the logical address of each zone 1:1, or one host logical address LBA may be mapped with two or more logical addresses of each zone.

The memory controller 1200 may determine a target zone corresponding to the host logical address LBA by referring to mapping information between the host logical address LBA and the logical addresses of each of the zones zone1 to zonen. Therefore, the memory controller 1200 may determine the target zone using the host logical address LBA included in the write request WRQ. In other words, the host 2000 may indirectly indicate the target zone through the host logical address LBA included in the write request WRQ. The memory controller 1200 may determine a logical address of the target zone on which the write operation is to be started, by referring to a write pointer corresponding to the target zone.

Next, the memory controller 1200 may determine a physical address PADD of the memory device 1100 corresponding to the logical address of the determined target zone, and transmit the determined physical address PADD and a write command PCMD (or a program command) corresponding to the write request WRQ to the memory device 1100 together with the data DATA received from the host 2000. For example, the memory controller 1200 may determine the physical address PADD by referring to address map tables that are stored in an internal memory 1210 and indicate a mapping relationship between the logical address of the zone and the physical address of the memory device.

Each of the zones zone1 to zonen may have various states. For example, each of the zones zone1 to zonen may have one state among an open state, a closed state, an erased state, and a full state. The erased state may mean a zone in which any data is not yet stored. The full state may mean a zone full of data. Data may not be stored in the zone in the erased state, the full state, or the closed state. The write operation may be performed on the zones in the open state. In particular, when a plurality of zones are in the open state and a write request for two or more zones in the open state is received from the host 2000, the memory controller 1200 may simultaneously perform the write operation on two or more zones in the open state.

When the memory controller 1200 receives an open request for at least one of the zones zone1 to zonen from the host 2000, the memory controller 1200 may change at least one of the zones in the erased state to the open state. In an embodiment, the memory controller 1200 may determine a write pointer (or an initial value thereof) corresponding to the zone changed to the open state. For example, the memory controller 1200 may determine the initial value of the write pointer to indicate the start logical address VPN0 of each zone. When the zones in the open state are full of data, the memory controller 1200 may change the states of the corresponding zones to the full state.

When the memory controller 1200 receives a close request for at least one of the zones zone1 to zonen from the host 2000, the memory controller 1200 may change the zone corresponding to the close request among the zones in the open state to the closed state. In an embodiment, the memory controller 1200 may return a resource for performing the write operation on the zone changed to the closed state.

Each of the zones zone1 to zonen may be used independently for each application program designated by the host 2000 and driven in the host 2000. In addition, since data used by the same application program is sequentially stored in one zone, and all data is deleted in a zone unit, there is an advantage that garbage collection may not occur or may be minimized.

In addition, since the data is stored only by sequential writing within the zone, writing may be possible using only one write pointer without necessity to manage each empty area in the zone with a table. Therefore, there is an advantage that a memory space required to manage the zones zone1 to zonen may be minimized.

Figure 11:
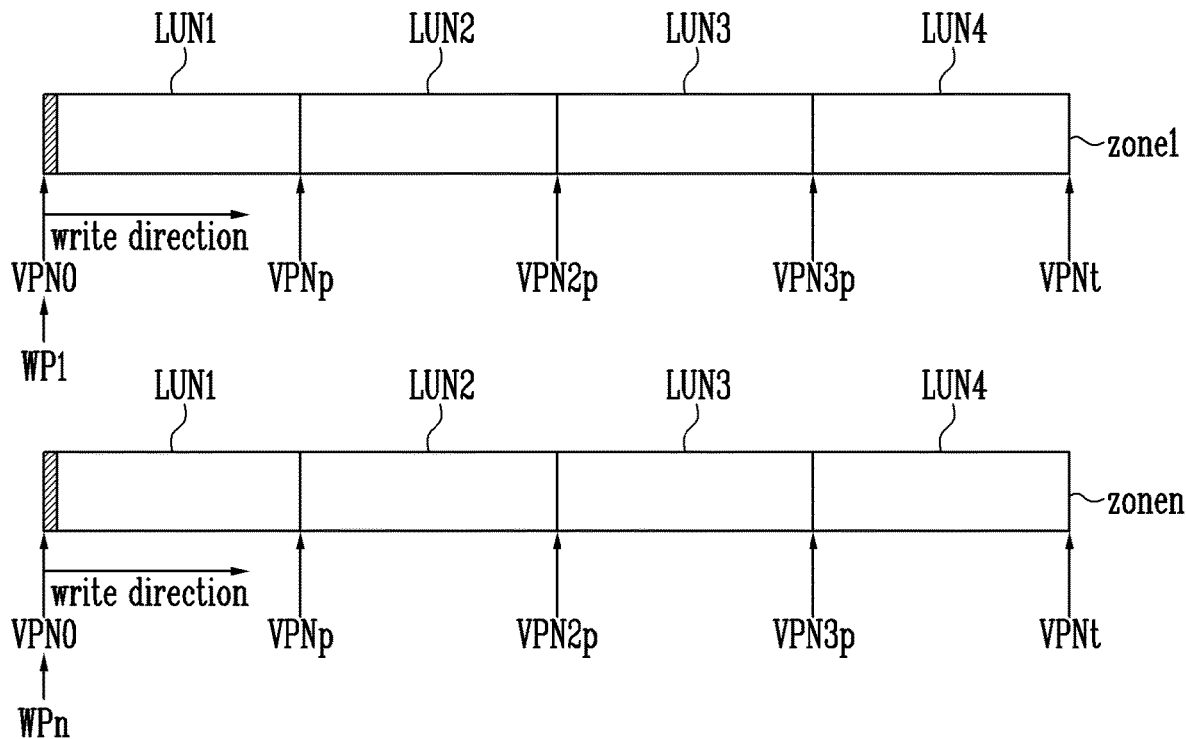
FIG. 11 is a diagram illustrating a write operation on a plurality of zones according to FIG. 8.

FIG. 11 is a diagram illustrating a write operation on the plurality of zones according to FIG. 8.

Referring to FIG. 11, an example in which the write operation is performed on the first zone zone1 and the n-th zone zonen is described. In an embodiment, it should be interpreted that the example is extended to the write operation on the plurality of zones zone1 to zonen.

When both of the first zone zone1 and the n-th zone zonen are in the open state and the write request WRQ for the first zone zone1 and the n-th zone zonen is first received from the host 2000, both of the write pointer WP1 of the first zone zone1, and a write pointer WPn of the n-th zone zonen may indicate the start logical address VPN0 of the respective zones. In an embodiment, the start logical address VPN0 of the first zone zone1 and the n-th zone zonen may correspond to the physical address of the first memory device LUN1.

Therefore, since the memory controller 1200 is required to perform the write operation on both of the first zone zone 1 and the n-th zone zonen in the first memory device LUN1, it may be difficult to simultaneously write data to the two zones within a single memory device.

That is, when the initial value of the write pointer of each of the zones zone1 to zonen is determined to indicate the start logical address and the write operation is first performed for each zone, since the write command is concentrated on a specific memory device (for example, the memory device corresponding to the start logical address), a problem occurs in which simultaneous writing may be impossible or delayed.

In addition, when data is written to at least some of the zones zone1 to zonen and some of the zones where the data is written are reset, the physical addresses (or memory blocks corresponding to the physical addresses) of the memory device corresponding to the logical addresses of the reset zones may be erased. In an embodiment, when the memory device corresponding to the start logical address VPN0 of each of the zones zone1 to zonen is fixed to a specific memory device (for example, the first memory device (LUN1)), the memory blocks of the memory device corresponding to the start logical address VPN0 may be required to be frequently erased. Therefore, there is a problem that a lifespan reduction occurs intensively in the memory device corresponding to the start logical address VPN0.

Figure 12:
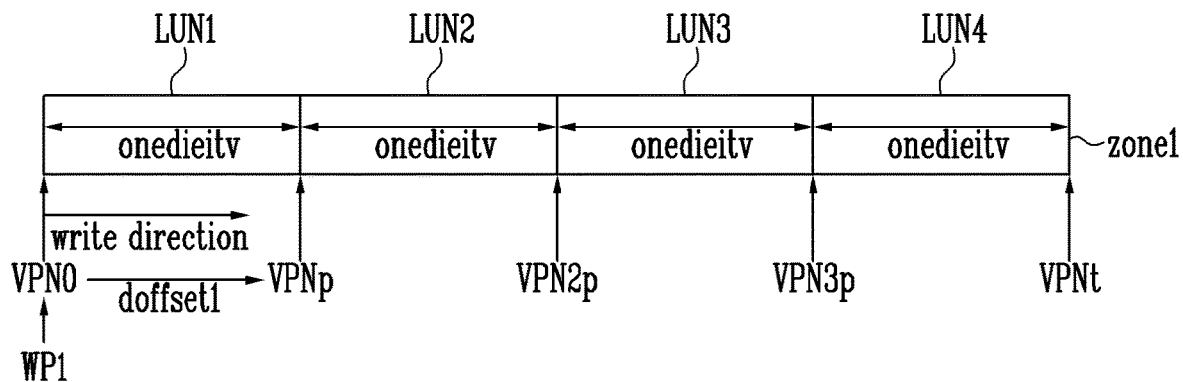
FIG. 12 is a diagram illustrating an offset corresponding to the plurality of zones according to FIG. 8.

FIG. 12 is a diagram illustrating an offset corresponding to the plurality of zones according to FIG. 8.

According to an embodiment of the present disclosure, in order to solve the problem that the write command is concentrated on a specific memory device, the memory controller 1200 may additionally use an offset in addition to the write pointer.

In an embodiment, the offset may be determined based on physical addresses of each memory device allocated for the zone. The physical addresses of each memory device allocated for the zone may be a physical address of an entire die included in the memory device, a physical address of an entire plane, or a physical address of an entire block.

In an embodiment, since the physical address of the memory device may be mapped (corresponding) to the logical address, respectively, the offset may be determined based on the number of the logical addresses covered (allocated) by one of the memory devices configuring the zone. That is, a length of the offset may be in units corresponding to the respective memory devices. For example, different offsets may correspond to different zones.

For example, referring to FIG. 12, the memory controller 1200 may determine an offset doffset1 of the first zone zone1 based on the number of logical addresses onedieitv occupied by one of the first to fourth memory devices LUN1 to LUN4 in the first zone zone1. Specifically, the memory controller 1200 may determine the offset doffset1 in a multiple unit of the number of logical addresses onedieitv occupied by one memory device. That is, one or more times of the number of logical addresses onedieitv occupied by one memory device may be determined as the offset doffset1. In an embodiment, when the memory controller 1200 changes at least one of the zones in the erased state to the open state, the memory controller 1200 may also determine the offset corresponding to the zone changed to the open state.

When receiving the write request WRQ including zone information (ZI) indicating one of the zones zone1 to zonen from the host 2000 after the offset is determined with respect to the zones (more specifically, the zones in the open state), the memory controller 1200 may determine the logical address on which the write operation is to be started, by using the offset and the write pointer of the zone indicated by the ZI. In more detail, the logical address on which the write operation is to be started may be determined by shifting the logical address indicated by the write pointer by the offset.

For example, as shown in FIG. 12, a case where the offset doffset1 corresponding to the first zone zone1 is determined as the number onedieitv of the logical address occupied by one memory device may be considered. In an embodiment, when an initial write request for the first zone zone1 (that is, it may correspond to a case where the write pointer WP1 of the first zone zone1 is the initial value) is received, the memory controller 1200 may determine the (p+1)-th logical address VPNp as the logical address on which the write operation is to be started, by applying the offset doffset1 to the start logical address VPN0 indicated by the write pointer WP1. That is, as the logical address on which the write operation is to be started, the (p+1)-th logical address VPNp is changed by an amount of the offset doffset1 from the start logical address VPN0, which is indicated by the write pointer WP1. In an embodiment, the start logical address VPN0 may correspond to the physical address of the first memory device LUN1, and the (p+1)-th logical address VPNp may correspond to the physical address of the second memory device LUN2. Therefore, the memory device on which the write operation is to be started may be set differently by using the offsets doffset1 to doffsetn corresponding to each of the zones zone1 to zonen. Thus, the write request concentrated on a specific memory device may be distributed to another memory device. In addition, in a case where data is distributed and stored in as many memory devices as possible as the write request is evenly distributed to the memory devices, when the erase operation is performed in memory devices corresponding to a storage area of a reset zone as the zone is reset later, the erase operation may be distributed to a plurality of memory devices. Therefore, a life of the specific memory device may be prevented from reducing faster than that of other memory devices.

Figure 13:
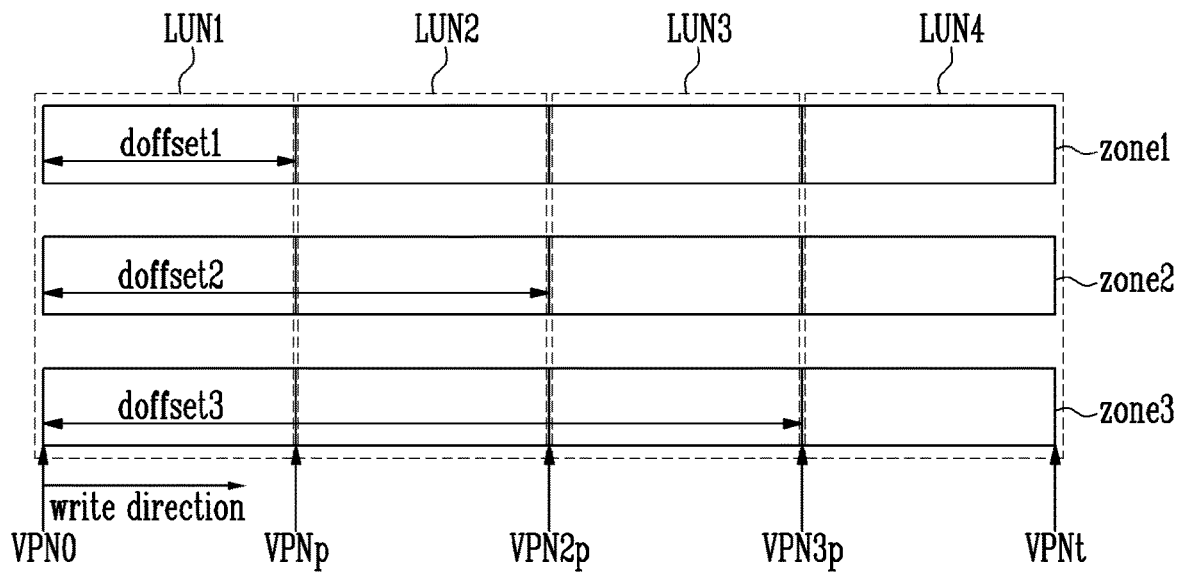
FIG. 13 is a diagram illustrating a method of applying the offset according to FIG. 12 to a plurality of zones.

FIG. 13 is a diagram illustrating a method of applying the offset according to FIG. 12 to a plurality of zones.

Referring to FIG. 13, a method of determining offsets doffset1 to doffset3 corresponding to the first to third zones zone1 to zone3 is described, and the method may be identically applied to other zones.

For example, when the first zone zone1 to the third zone zone3 are sequentially changed to the open state, and thus the offset is required to be determined sequentially for the first zone zone1 to the third zone zone3, the memory controller 1200 may increase the offset by k (k is a natural number equal to or greater than 1) time to the number of logical addresses occupied by one memory device onedieitv whenever the offset is determined.

First, the memory controller 1200 may determine, as an offset doffset1 for the first zone zone1, the number of logical addresses occupied by one memory device onedieitv. In another embodiment, the first determined offset doffset1 for the first zone zone1 may be determined as '0'. Next, the memory controller 1200 may determine, as an offset doffset1 for the second zone zone2, a value obtained by increasing the determined offset doffset1 for the first zone zone1 by the number of logical addresses occupied by one memory device onedieitv (or k times of the onedieitv). Next, the memory controller 1200 may determine, as an offset doffset3 for the third zone zone3, a value obtained by increasing the determined offset doffset1 for the second zone zone2 by the number of logical addresses occupied by one memory device onedieitv (or k times of the onedieitv).

As described above, when the offsets doffset1 to doffset3 are determined, an initial write operation for the first zone zone1 (the write pointer may indicate the start logical address in the initial write operation) may be performed from the second memory device LUN2 corresponding to the (p+1)-th logical address VPNp (p is a natural number equal to or greater than 1), an initial write operation for the second zone zone2 may be performed from the third memory device LUN3 corresponding to the (2p+1)-th logical address VPN2*p*, and an initial write operation for the third zone zone3 may be performed from the fourth memory device LUN4 corresponding to the (3p+1)-th logical address VPN3*p*.

Meanwhile, a case may occur where the logical address obtained by applying the offset to the logical address indicated by the write pointer may exceeds the last logical address of the zone.

For example, when the memory controller 1200 determines the offset doffset1 for the first zone zone1 and determines a value obtained by increasing the offset doffset1 by three times as the offset doffset2 for the second zone zone2, the logical address obtained by applying the offset doffset2 for the second zone zone2 to the start logical address VPN0 indicated by the write pointer (for example, the initial value of the write pointer) of the second zone zone2 may exceed the last logical address VPNt of the second zone zone2. In this case, the logical address on which the write operation is to be started may be determined by additionally increasing the logical address indicated by the write pointer by the number of the exceeded logical address. Therefore, the initial write operation for the second zone zone2 may be started from the start logical address VPN0.

Figure 14:
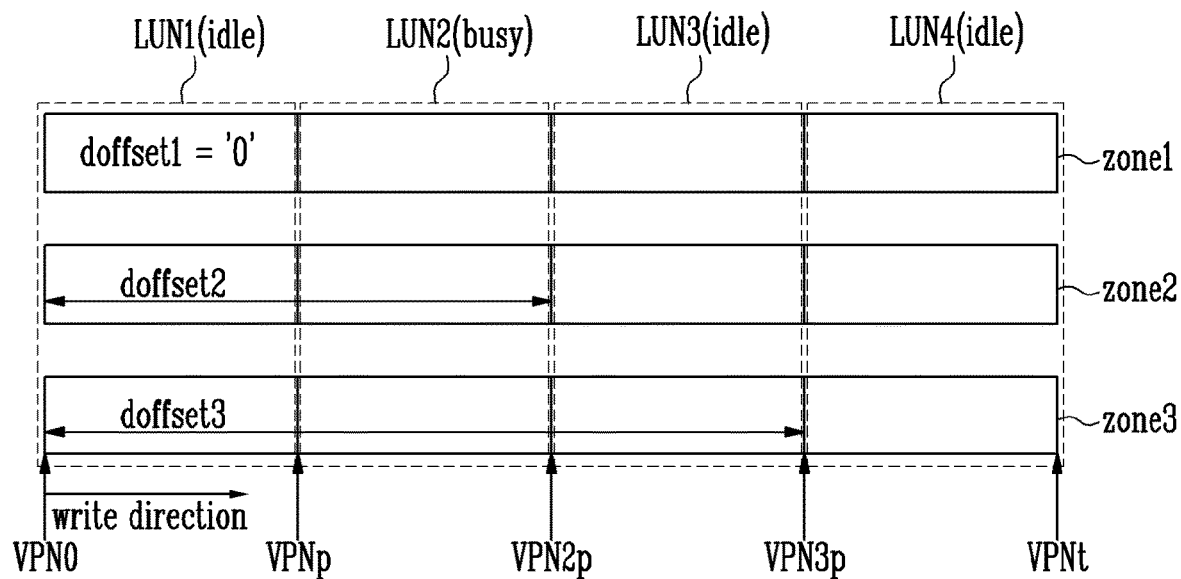
FIG. 14 is a diagram illustrating a method of applying an offset to a plurality of zones in consideration of a state of a memory device according to an embodiment of the present disclosure.

FIG. 14 is a diagram illustrating a method of applying an offset to a plurality of zones in consideration of a state of a memory device according to an embodiment of the present disclosure.

In an embodiment, the memory controller 1200 may determine the offset in consideration of the idle/busy state of the memory devices. In more detail, the memory controller 1200 may determine the offset so that the logical address obtained by increasing the start logical address VPN0 by the offset corresponds to a physical address of the memory device in the idle state among the memory devices. Here, whether the memory device is in the idle state may be determined by referring to the ready-busy signal received from the RB pad RB based on a time point at which the offset is determined.

For example, referring to FIG. 14, in response to the open request for the first zone zone1 received from the host 2000, the memory controller 1200 may change the state of the first zone zone1 to the open state, and determine the offset doffset1 as '0' so that the logical address obtained by increasing the start logical address VPN0 by the offset doffset1 corresponds to the physical address of the first memory device LUN1 in the idle state.

In response to the open request for the second zone zone2 received from the host 2000, the memory controller 1200 may change the state of the second zone zone2 to the open state, and determine the offset doffset2 as two times of the number of logical addresses occupied by one memory device onedieitv so that the logical address VPN2$p$ obtained by applying the offset doffset2 to the start logical address VPN0 corresponds to the physical address of the third memory device LUN3 in the idle state.

In response to the open request for the third zone zone3 received from the host 2000, the memory controller 1200 may change the state of the third zone zone3 to the open state, and determine the offset doffset3 as three times of the number of logical addresses occupied by one memory device onedieitv so that the logical address VPN3$p$ obtained by applying the offset doffset3 to the start logical address VPN0 corresponds to the physical address of the fourth memory device LUN4 in the idle state.

Figure 15:
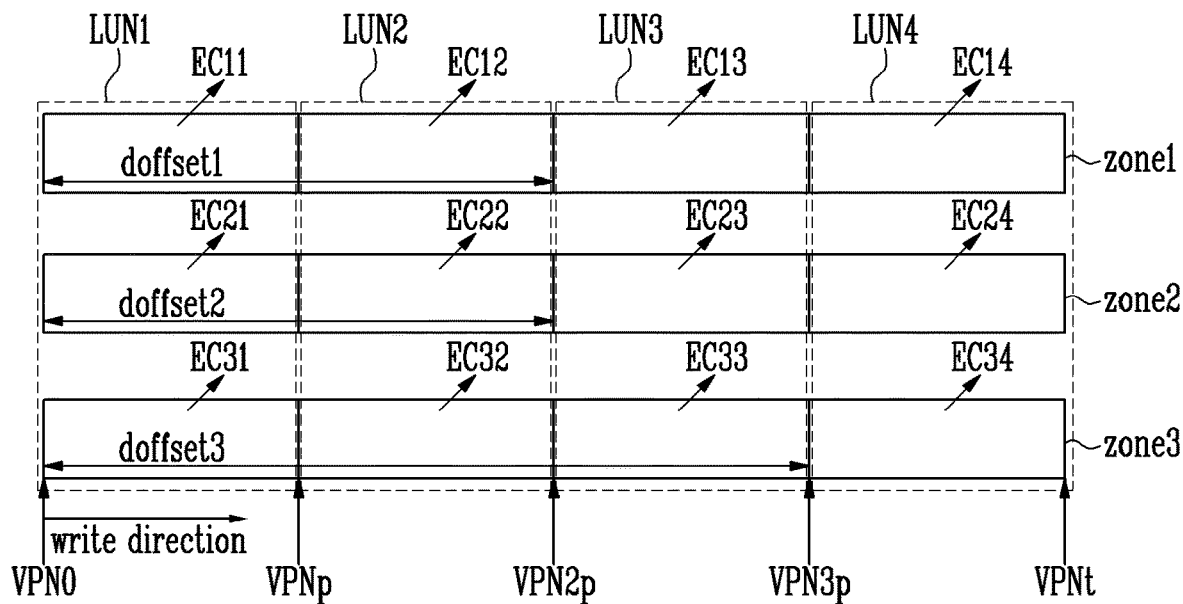
FIG. 15 is a diagram illustrating a method of applying an offset to a plurality of zones in consideration of an erase count of a memory device according to an embodiment of the present disclosure.

FIG. 15 is a diagram illustrating a method of applying an offset to a plurality of zones in consideration of an erase count of a memory device according to an embodiment of the present disclosure.

In an embodiment, the memory controller 1200 may determine the offset in consideration of the erase count of the memory block included in the memory devices configuring the zone. In more detail, the memory controller 1200 may determine the offset so that the logical address obtained by increasing the start logical address VPN0 by the offset corresponds to the physical address of the memory device of which the erase counts EC11, EC12, . . . , EC33, and EC34 are the smallest among the memory devices. Here, the erase counts EC11, EC12, . . . , EC33, and EC34 may be values counted whenever the memory blocks of each of the memory devices configuring the zone are erased. For example, the erase count EC11 of the first memory device LUN1 may increase by one whenever the memory blocks of the first memory device LUN1 configuring the first zone zone1 are erased. In addition, the erase counts of each of the memory devices may be counted individually for each zone. For example, the erase count EC11 of the memory blocks of the first memory device LUN1 configuring the first zone zone1 and the erase count EC21 of the memory blocks of the first memory device LUN1 configuring the second zone zone2 may be different from each other.

Referring to FIG. 15, the memory controller 1200 may change the state of the first zone zone1 to the open state in response to the open request for the first zone zone1 received from the host 2000. Next, the memory controller 1200 may determine the offset so that the logical address obtained by increasing the start logical address VPN0 of the first zone zone1 by the offset doffset1 corresponds to the physical address of the memory device having the smallest erase count among the erase counts EC11, EC12, EC13, and EC14 of the memory devices configuring the first zone zone1. For example, when the erase count EC13 of the third memory device LUN3 is the smallest among the erase counts EC11, EC12, EC13, and EC14 of the memory devices configuring the first zone zone1, the memory controller 1200 may determine the offset doffset1 as two times the number of logical addresses occupied by one memory device onedieitv so that the logical address VPN2$p$ obtained by increasing the start logical address VPN0 of the first zone zone1 by the offset doffset1 corresponds to the physical address of the third memory device LUN3.

In the same method as the first zone zone1, when the erase count EC23 of the third memory device LUN3 is the smallest among the erase counts EC21, EC22, EC23, and EC24 of the memory devices configuring the second zone zone2, the memory controller 1200 may determine the offset doffset1 as two times the number of logical addresses occupied by one memory device onedieitv so that the logical address VPN2$p$ obtained by increasing the start logical address VPN0 of the second zone zone2 by the offset doffset2 corresponds to the physical address of the third memory device LUN3.

In the same method as the first zone zone1, when the erase count EC34 of the fourth memory device LUN4 is the smallest among the erase counts EC31, EC32, EC33, and EC34 of the memory devices configuring the third zone zone3, the memory controller 1200 may determine the offset doffset3 as three times the number of logical addresses occupied by one memory device onedieitv so that the logical address VPN3$p$ obtained by increasing the start logical address VPN0 of the third zone zone3 by the offset doffset3 corresponds to the physical address of the fourth memory device LUN4.

Figure 16:
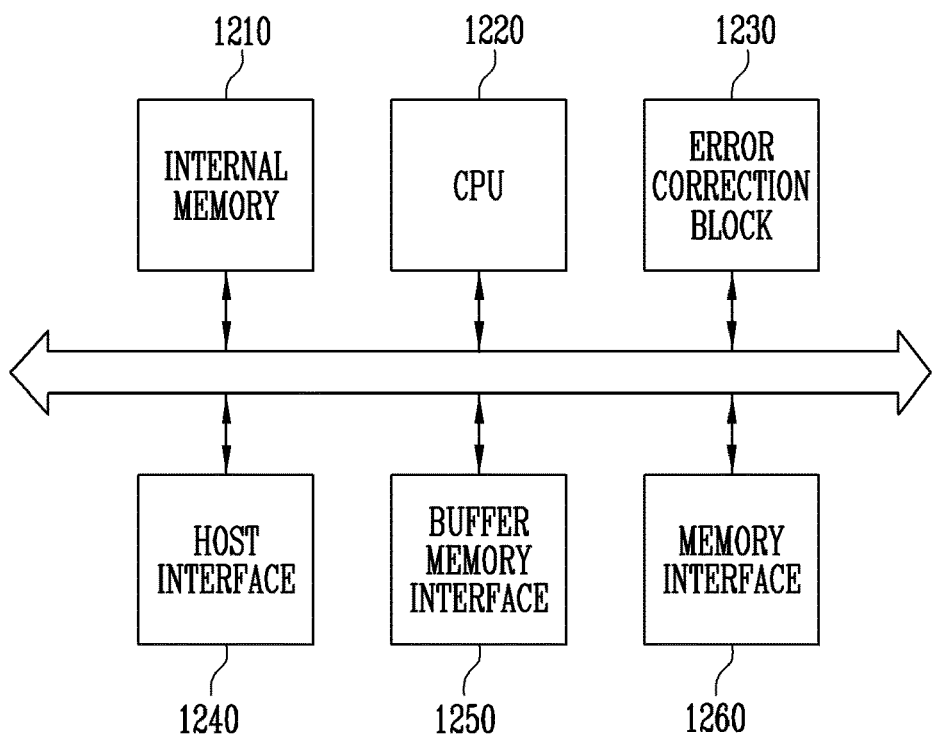
FIG. 16 is a diagram illustrating a memory controller according to FIG. 1.

FIG. 16 is a diagram illustrating the memory controller according to FIG. 1.

Referring to FIG. 16, the memory controller 1200 may include an internal memory 1210, a central processing unit (CPU) 1220, an error correction block 1230, a host interface 1240, a buffer memory interface 1250, and a memory interface 1260.

The internal memory 1210 may store various information necessary for an operation of the memory controller 1200. For example, the internal memory 1210 may include the address map tables indicating the mapping relationship between the logical address of the zone and the physical address of the memory device. In addition, the internal memory 1210 may store the state, the write pointer, the offset, and the like for each of the zones zone1 to zonen. For example, the internal memory 1210 may store the offsets for the respective zones zone1 to zonen using a queue. When the memory controller 1200 receives the open request from the host 2000, the memory controller 1200 may get the offset stored in the queue of the internal memory 1210, determine the get offset as the offset for the zone corresponding to the open request, and put the get offset into the queue again. The offsets sequentially stored in the queue initially may be values obtained by sequentially increasing by k (k is a natural number equal to or greater than 1) time to the number of logical addresses occupied by one memory device onedie-itv. The internal memory 1210 may be configured of at least one of a random access memory (RAM), a dynamic RAM (DRAM), a static RAM (SRAM), a cache, and a tightly coupled memory (TCM). At least some of the data stored in the internal memory 1210 may be stored in the memory device 1100 when power is turned off, and may be read from the memory device 1100 and may be stored in the internal memory 1210 when power is turned on.

The CPU 1220 may perform various or generate various command operations for controlling the memory device 1100. When the CPU 1220 receives a request from the host 2000, the CPU 1220 may generate a command according to the received request and transmit the generated command to the error correction block 1230. The CPU 1220 may perform the operation of the memory controller 1200 described with reference to FIGS. 8 to 13. In more detail, the CPU 1220 may perform various operations according to instructions instructing the operation of the memory controller 1200 described above.

The error correction block 1230 is configured to detect and correct an error of data received from the memory device 1100 using an error correction code (ECC). The CPU 1220 may control the memory device 1100 to adjust a read voltage according to an error detection result of the error correction block 1230 and perform re-reading. In an embodiment, the error correction block may be provided as a component of the memory controller 1200.

The host interface 1240 may exchange a command, an address, and data between the memory controller 1200 and the host 2000. For example, the host interface 1240 may receive the request, the address, and the data from the host 2000 and output data read from the memory device 1100 to the host 2000. The host interface 1240 may communicate with the host 2000 using a protocol such as peripheral component interconnect express (PCIe), advanced technology attachment (ATA), serial ATA (SATA), parallel ATA (PATA), serial attached SCSI (SAS) or nonvolatile memory express (NVMe). The host interface 1240 is not limited to the above-described example, and may include various interfaces such as universal serial bus (USB), multi-media card (MMC), enhanced small disk interface (ESDI), or integrated drive electronics (IDE).

The buffer memory interface 1250 may transmit data between the CPU 1220 and a buffer memory (not shown) of the memory system 1000. The buffer memory (not shown) may be used as an operation memory or a cache memory of the memory controller 1200, and may store system data used in the memory system 1000 in addition to the above-described information. According to an embodiment, the buffer memory (not shown) may include a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or a Rambus dynamic random access memory (RDRAM). When the buffer memory is included in the memory controller 1200, the buffer memory interface 1250 may be omitted.

The memory interface 1260 may exchange the command, the address, and the data between the memory controller 1200 and the memory device 1100. For example, the memory interface 1260 may transmit the command, the address, and the data to the memory device 1100 through a channel, and may receive the data and the like from the memory device 1100.

Figure 17:
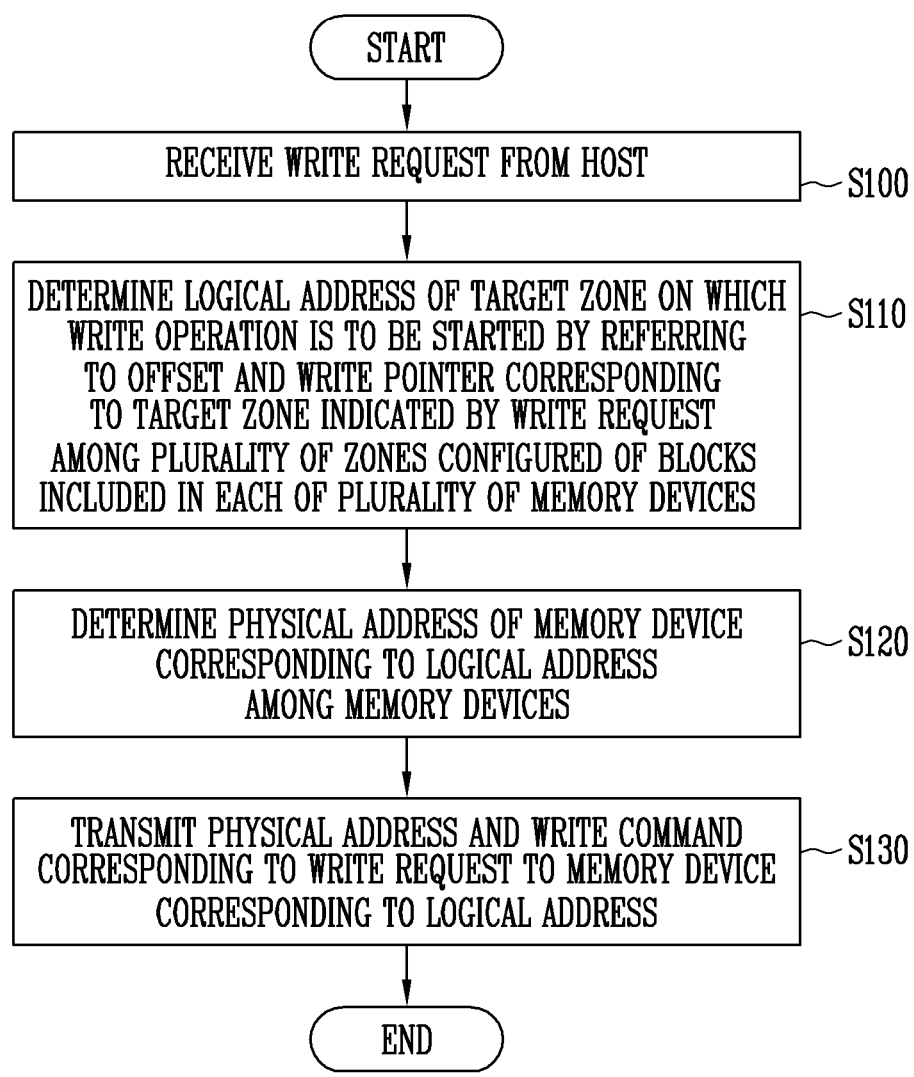
FIG. 17 is a flowchart illustrating an operation of the memory controller according to FIG. 16.

FIG. 17 is a flowchart illustrating an operation of the memory controller according to FIG. 16.

Referring to FIG. 17, a method of operating a memory controller may include receiving a write request from a host (S100), determining a target zone indicated by the write request among a plurality of zones configured of blocks included in each of a plurality of memory devices, and a logical address of the target zone on which a write operation is to be started based on a write pointer and an offset corresponding to the target zone (S110), determining a physical address of a memory device corresponding to the logical address of the target zone among the plurality of memory devices (S120), and transmitting a write command corresponding to the write request and the physical address to the memory device corresponding to the logical address of the target zone (S130).

The offset may be determined based on the number of logical addresses occupied by one of the plurality of memory devices in an entire range of the logical address.

The offset may be determined in a multiple unit of the number of logical addresses occupied by one of the plurality of memory devices in an entire range of the logical address.

Determining the logical address of the target zone (S110) may include determining the logical address of the target zone by increasing a logical address indicated by the write pointer by the offset.

Determining the logical address of the target zone (S110) may include determining the logical address of the target zone by additionally increasing the logical address indicated by the write pointer by the number of an exceeded logical address when the logical address of the target zone determined by increasing the logical address indicated by the write pointer by the offset exceeds a last logical address of the target zone.

The method may include, before receiving the write request (S100), receiving an open request for the target zone from the host and changing a state of the target zone among the zones to an open state in response to the open request. The determining of the offset may include determining the offset corresponding to the target zone of the open state.

Determining the offset may include increasing the offset by k (k is a natural number equal to or greater than 1) time to the number of logical addresses occupied by one memory device each time the offset is determined.

An initial value of the write pointer may indicate a start logical address of the target zone.

Determining the offset may include determining the offset corresponding to the target zone so that the logical address of the target zone obtained by increasing the start logical address by the offset corresponds to a physical address of a memory device in an idle state among the plurality of memory devices.

Determining the offset may include determining the offset corresponding to the target zone so that the logical address of the target zone obtained by increasing the start logical address by the offset corresponds to a physical address of a memory device of which an erase count is smallest among the plurality of memory devices.

At least some of the plurality of memory devices may be connected to the memory controller through different channels.

Figure 18:
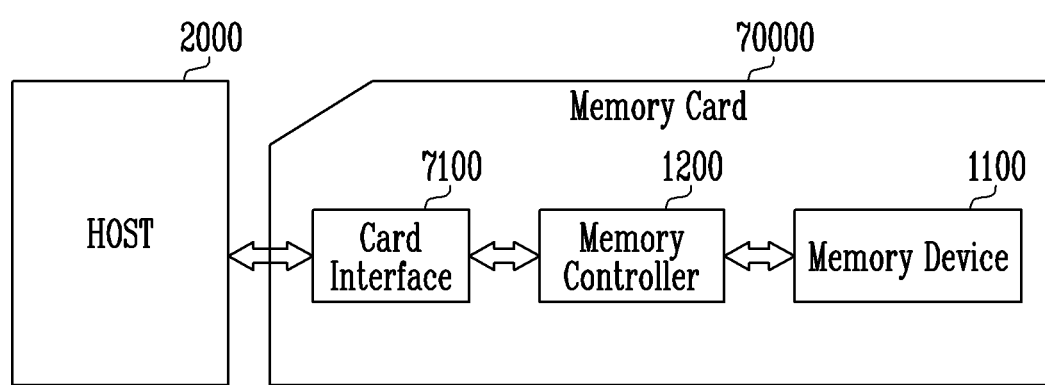
FIG. 18 is a diagram illustrating a memory card to which the memory system according to FIG. 1 is applied.

FIG. 18 is a diagram illustrating a memory card to which the memory system according to FIG. 1 is applied.

Referring to FIG. 18, a memory system may include the host 2000 and the memory card 70000.

The memory card 70000 may be implemented as a smart card. The memory card 70000 may include the memory device 1100, the memory controller 1200, and a card interface 7100.

The memory controller 1200 may control data exchange between the memory device 1100 and the card interface 7100. According to an embodiment, the card interface 7100 may be a secure digital (SD) card interface or a multi-media card (MMC) interface, but is not limited thereto.

The card interface 7100 may interface data exchange between the host 2000 and the memory controller 1200 according to a protocol of the host 2000. According to an embodiment, the card interface 7100 may support a universal serial bus (USB) protocol, and an interchip (IC)-USB protocol. Here, the card interface 7100 may refer to hardware capable of supporting a protocol that is used by the host 2000, software installed in hardware, or a signal transmission method.

Figure 19:
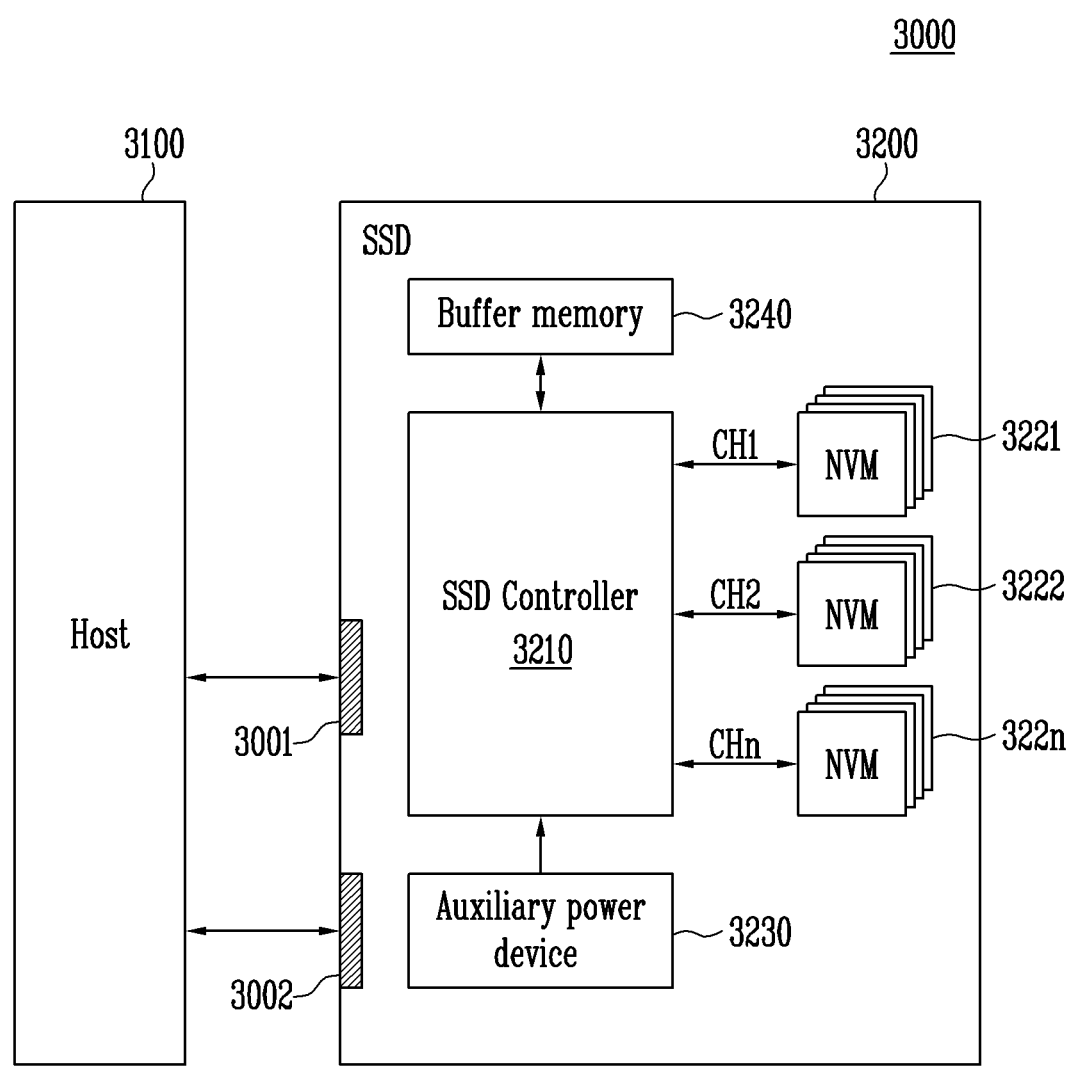
FIG. 19 is a block diagram illustrating a solid state drive (SSD) system to which the memory system according to FIG. 1 is applied.

FIG. 19 is a block diagram illustrating a solid state drive (SSD) system to which the memory system according to FIG. 1 is applied.

Referring to FIG. 19, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

In an embodiment, the SSD controller 3210 may correspond to the memory controller 1200, and the flash memories 3221 to 322n may be components corresponding to the memory devices 1100.

The SSD controller 3210 may control the plurality of flash memories 3221 to 322n in response to the signal SIG received from the host 3100. For example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge the power. The auxiliary power device 3230 may provide power to the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

While certain embodiments have been described above, it will be understood to those skilled in the art that the embodiments described are by way of example only. Accordingly, the memory system should not be limited based on the described embodiments. Rather, the memory system described herein should only be limited in light of the claims that follow when taken in conjunction with the above description and accompanying drawings.

What is claimed is:

1. A memory system comprising:
 a plurality of memory devices including a plurality of blocks configured of memory cells; and
 a memory controller configured to control the plurality of memory devices corresponding to a plurality of zones by configuring the plurality of zones with the plurality of blocks included in each of the plurality of memory devices,
 wherein the memory controller is further configured to:
 open a target zone among the plurality of zones in response to a request from outside,
 determine an offset of the target zone based on one or more selected from the group consisting of order in which the target zone is opened among the plurality of zones, ready-busy signals received from the plurality of memory devices, and erase counts of the plurality of blocks; and
 determine a logical address of the target zone on which a write operation is to be started based on the offset and a write pointer corresponding to the target zone.

2. The memory system of claim 1, wherein the memory controller is further configured to determine the offset based on a number of logical addresses occupied by one of the plurality of memory devices among logical addresses of the target zone.

3. The memory system of claim 2, wherein the memory controller determines the offset as n times the number of logical addresses occupied by one of the plurality of memory devices,
 where n is an integer greater than or equal to 0.

4. The memory system of claim 1, wherein the memory controller determines the logical address of the target zone by increasing a logical address indicated by the write pointer by the offset.

5. The memory system of claim 4, wherein when the logical address of the target zone determined by increasing the logical address indicated by the write pointer by the offset exceeds a last logical address of the target zone, the memory controller determines the logical address of the target zone by additionally increasing the logical address indicated by the write pointer by a number of exceeded logical address.

6. The memory system of claim 3,
wherein the memory controller is further configured to change a state of the target zone to an open state.

7. The memory system of claim 6, wherein the memory controller determines the offset by increasing the offset by k time, where k is a natural number equal to or greater than 1, to the number of logical addresses occupied by one of the plurality of memory devices each time the offset is determined.

8. The memory system of claim 6, wherein an initial value of the write pointer indicates a start logical address of the target zone.

9. The memory system of claim 8, wherein the memory controller determines the offset corresponding to the target zone to obtain the logical address of the target zone, by applying the offset to the start logical address, corresponding to a physical address of a memory device in an idle state among the plurality of memory devices.

10. The memory system of claim 8, wherein the memory controller determines the offset corresponding to the target zone to obtain the logical address of the target zone, by applying the offset to the start logical address, corresponding to a physical address of a memory device of which an erase count is smallest among the plurality of memory devices.

11. The memory system of claim 1, wherein at least some of the plurality of memory devices are connected to the memory controller through different channels.

12. A method of operating a memory controller, the method comprising:
opening a target zone among a plurality of zones configured of a plurality of blocks included in each of a plurality of memory devices in response to a request from outside;
determining an offset of the target zone based on one or more selected from the group consisting of order in which the target zone is opened among the plurality of zones, ready-busy signals received from the plurality of memory devices, and erase counts of the plurality of blocks; and
determining a logical address of the target zone on which a write operation is to be started based on the offset and a write pointer corresponding to the target zone.

13. The method of claim 12, further comprising determining the offset based on a number of logical addresses occupied by one of the plurality of memory devices among logical addresses of the target zone,
wherein the offset is determined as n times the number of logical addresses occupied by one of the plurality of memory devices,
where n is an integer greater than or equal to 0.

14. The method of claim 12, wherein the logical address of the target zone is determined by increasing a logical address indicated by the write pointer by the offset.

15. The method of claim 14, wherein the logical address of the target zone is determined by additionally increasing the logical address indicated by the write pointer by a number of exceeded logical address when the logical address of the target zone determined by increasing the logical address indicated by the write pointer by the offset exceeds a last logical address of the target zone.

16. The method of claim 12,
further comprising:
determining a physical address of a memory device corresponding to the logical address of the target zone among the plurality of memory devices; and
transmitting a write command corresponding to the request and the physical address to the memory device corresponding to the logical address of the target zone.

17. The method of claim 12, wherein an initial value of the write pointer indicates a start logical address of the target zone.

18. The method of claim 17, wherein the offset corresponding to the target zone is determined so that the logical address of the target zone obtained by increasing the start logical address by the offset corresponds to a physical address of a memory device in an idle state among the plurality of memory devices.

19. The method of claim 17, wherein the offset corresponding to the target zone is determined so that the logical address of the target zone obtained by increasing the start logical address by the offset corresponds to a physical address of a memory device of which an erase count is smallest among the plurality of memory devices.

* * * * *